United States Patent
Hirose (10) Patent No.: US 7,519,398 B2
(45) Date of Patent: Apr. 14, 2009

(54) COMMUNICATION TERMINAL APPARATUS AND A COMMUNICATION PROCESSING PROGRAM

(75) Inventor: Kazuo Hirose, Tachikawa (JP)

(73) Assignee: Casio Computer Col, Ltd., Tokyo (JP)

( * ) Notice: Subject to any disclaimer, the term of this patent is extended or adjusted under 35 U.S.C. 154(b) by 562 days.

(21) Appl. No.: 11/109,908

(22) Filed: Apr. 19, 2005

(65) Prior Publication Data

US 2005/0245287 A1 Nov. 3, 2005

(30) Foreign Application Priority Data

Apr. 30, 2004 (JP) ............................. 2004-136608

(51) Int. Cl.
H04Q 7/20 (2006.01)
(52) U.S. Cl. .................... 455/567; 455/456.1; 455/415; 455/457
(58) Field of Classification Search ............. 455/456.1, 455/415, 457, 557, 566, 564, 535.1, 90, 90.1; 379/355, 88.17, 67.1, 88.18; 707/530
See application file for complete search history.

(56) References Cited

U.S. PATENT DOCUMENTS

| | | | |
|---|---|---|---|
| 6,405,060 B1 * | 6/2002 | Schroeder et al. ........... 455/566 |
| 6,603,837 B1 * | 8/2003 | Kesanupalli et al. ..... 379/88.17 |
| 6,628,194 B1 | 9/2003 | Hellebust et al. |
| 6,778,834 B2 * | 8/2004 | Laitinen et al. ............. 455/450 |
| 2003/0063323 A1 | 4/2003 | Aoki |
| 2003/0099336 A1 | 5/2003 | Speeney et al. |
| 2004/0198427 A1 | 10/2004 | Kimbell et al. |
| 2004/0235520 A1 * | 11/2004 | Cadiz et al. ................. 455/557 |
| 2005/0032527 A1 * | 2/2005 | Sheha et al. ............. 455/456.1 |
| 2005/0248437 A1 | 11/2005 | Hellebust et al. |

FOREIGN PATENT DOCUMENTS

| | | |
|---|---|---|
| EP | 1 365 564 A1 | 11/2003 |
| JP | 11-154975 A | 6/1999 |
| JP | 2001-109487 A | 4/2001 |
| JP | 2003-110746 A | 4/2003 |
| WO | WO 03/005685 A1 | 1/2003 |

OTHER PUBLICATIONS

Japanese Office Action dated Jun. 13, 2008, issued in counterpart Japanese application No. 2004-136608 and English translation thereof.

* cited by examiner

Primary Examiner—Tony T Nguyen
(74) Attorney, Agent, or Firm—Frishauf, Holtz, Goodman & Chick, P.C.

(57) ABSTRACT

A communication terminal apparatus is provided, with which a user can check contents of an incoming mail in the same manner as in an incoming call. A reading-out registration data YTD including a mail address MAD and a key word KWD is previously stored. When an address of a sender of the received mail coincides with the mail address MAD in the reading-out registration data YTD and a key word KWD corresponding to mail address MAD is included in the received mail, a phone number corresponding to the mail address of the sender is searched through an address book and the searched phone number is displayed on a display unit 4 while the incoming mail is notified and further contents of the incoming mail are read out in response to an off-hook operation, whereby incoming of a mail including a predetermined attribute is notified with an incoming-call alert which is generally used to notify an incoming call.

18 Claims, 5 Drawing Sheets

COMMUNICATION TERMINAL APPARATUS AND A COMMUNICATION PROCESSING PROGRAM

CROSS-REFERENCE TO RELATED APPLICATIONS

This application is based upon and claims the benefit of priority from the prior Japanese Patent Application No. 2004-136603, filed Apr. 30, 2004, the entire contents of which are incorporated herein by reference.

BACKGROUND OF THE INVENTION

1. Field of the Invention

The present invention relates to a communication terminal apparatus and a communication processing program, which allow a user to check contents of an incoming mail in the same manner as in a conventional telephone call.

2. Description of the Related Art

In the conventional mail system employed in many communication terminal apparatuses such as cellular phones, upon receipt of an incoming mail, the server on the network notifies a cellular-phone station of the incoming mail using a short message service (SMS), and the cellular-phone station drives a mailer upon receipt of SMS to fetch the incoming mail from the server, notifying a user of the incoming mail. With respect to the conventional mail system, a technology such as reading out contents of a mail has been developed for convenience of visually-impaired users. Further, various mail functions have been developed to improve user-friendliness in using the mail system. For example, as disclosed in Japanese laid-open patent application No. Hei 11-154975, an invention has been made, in which when a mail including a preset key word is received from a previously designated address, then such received mail is determined as an "urgent mail".

SUMMARY OF THE INVENTION

Meanwhile, the communication terminal apparatuses such as a cellular phone having the above mentioned mail functions still have problems set forth below.

(a) In general, though various mail functions have been developed to improve convenience in using the communication terminal apparatuses, manipulations different from those operated for conventional telephone call are required as new mail functions have been provided. As a result, there is caused a problem that the communication terminal apparatuses become hard to use not only for users (old people and children) who are weak in performing complex manipulations but for those visually-impaired.

(b) It is common practice that there is no need to check contents of a received mail at once, because they may be checked any time later. Therefore, there is a bad effect that those who read a mail during a conference or a meeting can be frowned by those around.

The present invention has been made in consideration of the above mentioned situations, and has an object to provide a communication terminal apparatus and a communication processing program, which allow a user to check contents of a mail in the same manner as in the conventional telephone call.

DETAILED DESCRIPTION OF THE PREFERRED EMBODIMENTS

Now, a communication terminal apparatus according to an embodiment of the present invention will be described with reference to the accompanying drawings.

I. Configuration

Figure 1:
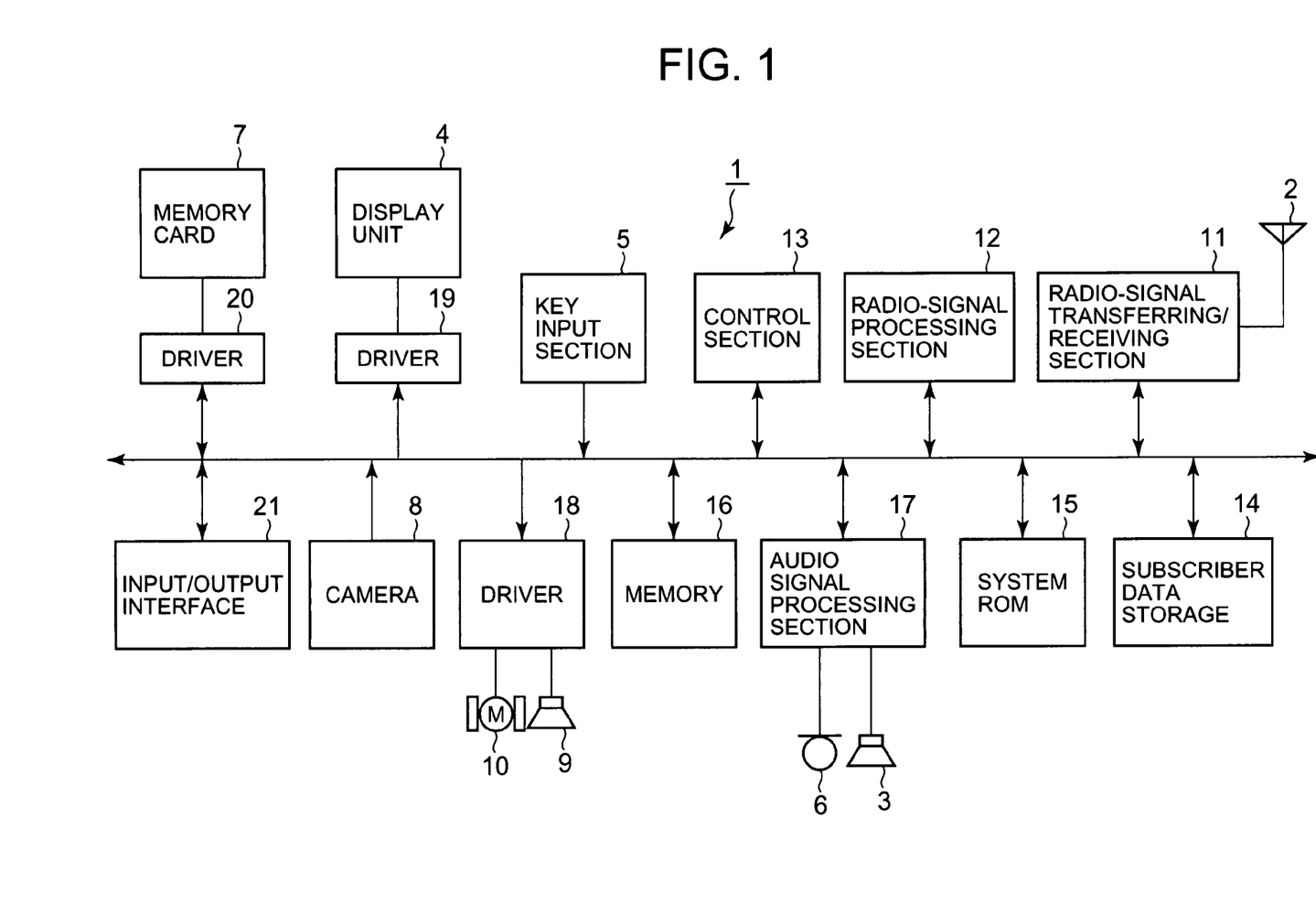
FIG. 1 is a block diagram of a configuration of a cellular phone 1 according to an embodiment of the present invention.

FIG. 1 is a block diagram showing a configuration of a cellular phone 1 according to the embodiment of the present invention. The cellular phone 1 has, for example, a foldable structure and can be brought to a folded state or an unfolded state. A main body (not shown) of the cellular phone 1 is provided with an antenna 2 for transferring and/or receiving a signal, a speaker 3 for generating a sound, a display unit 4 including a color liquid crystal display panel, a key input section 5, a microphone 6 for entering voice, a memory card 7 or a detachable storage in which data is stored or from which data is read out, a camera 8 for photographing an image, a speaker 9 for generating an alert, and a vibrator 10 which vibrates to notify an incoming call.

The key input section 5 is provided with various special switches and function switches to which various functions are assigned. Switches serving as a typical special switch include a power switch used for turning on the power, an off-hook/on-hook switch operated for starting communication and for breaking a line connection, and the like. A radio-signal transferring/receiving section 11 amplifies a high frequency signal received through the antenna 2 and outputs the amplified signal to a following stage, that is, a radio-signal processing section 12. Meanwhile, this radio-signal transferring/receiving section 11 amplifies a high frequency signal output from the radio-signal processing section 12 and sends out the amplified radio signal through the antenna 2. The radio-signal processing section 12 demodulates a high frequency signal amplified by the radio-signal transferring/receiving section 11, and also modulates transferring data supplied from a control section 13 to generate a transferring signal. The control section 13 receives and supplies data through a system bus to control entire operation of the apparatus. Operation of the control section 13, which relates to the essence of the present invention, will hereafter be described in detail. A subscriber data storage 14 has an incoming-call record area for recording incoming-call histories such as dates and phone numbers of incoming calls, and an outgoing-call record area for recording outgoing-call histories such as dates and phone numbers of outgoing calls.

A system ROM 15 stores human voice data, various initializing data, and various image data in addition to a program executed by the control section 13. Note that the program to be executed by the control section 13 includes a main routine process and a mail receiving process, which will hereinafter be described in detail. The various image data stored in the system ROM 15 are data used for forming a stand-by screen and a number entering screen. A memory 16 has a work area, a mail area, and data area. The work area of the memory 16 temporarily stores register flag data used in various processes executed by the control section 13. The work area has an image buffer area for temporarily storing photographed image data supplied from the camera 8.

Figure 2:
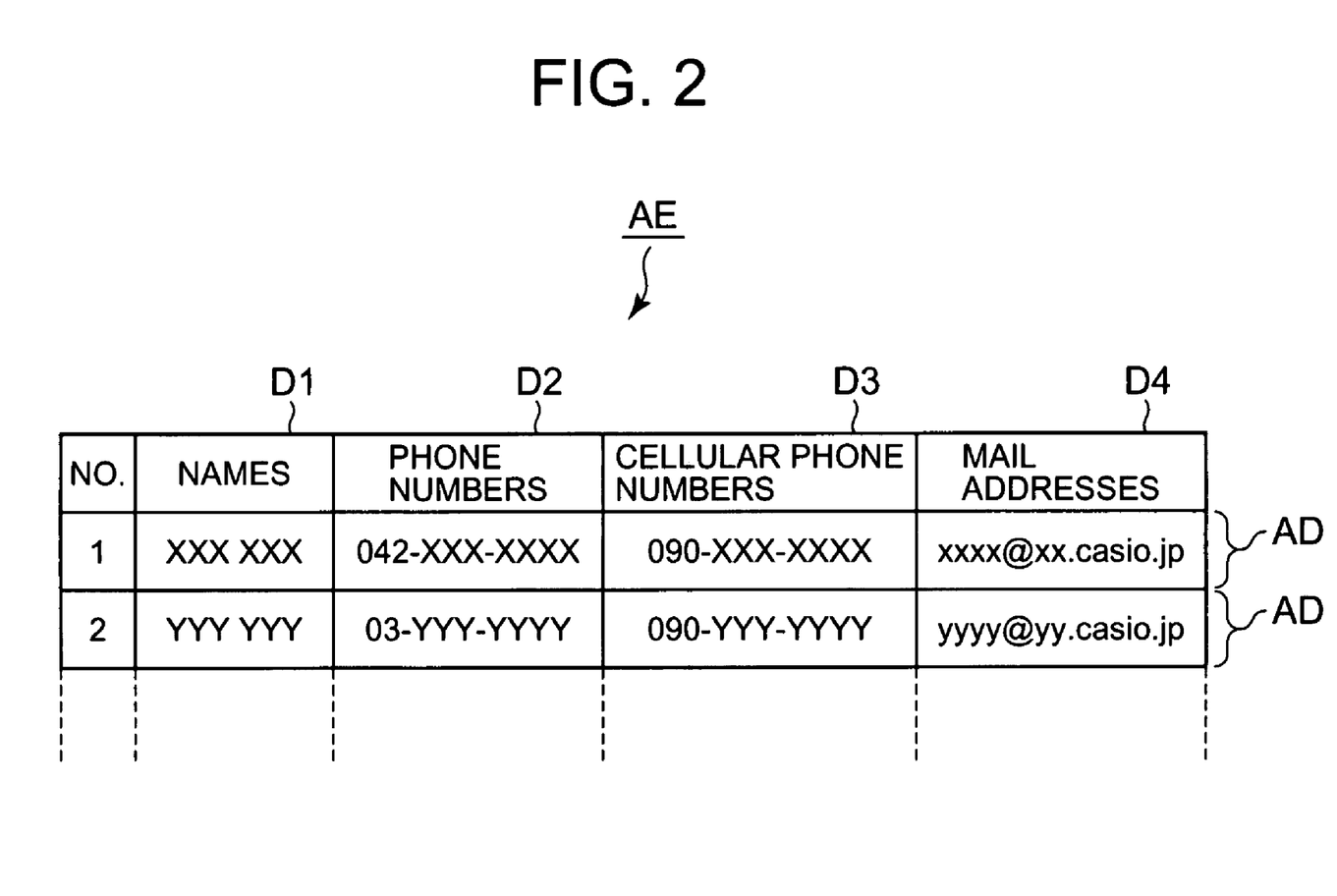
FIG. 2 is a view showing contents of address-book data AD stored in an address-book area AE.
Figure 3:
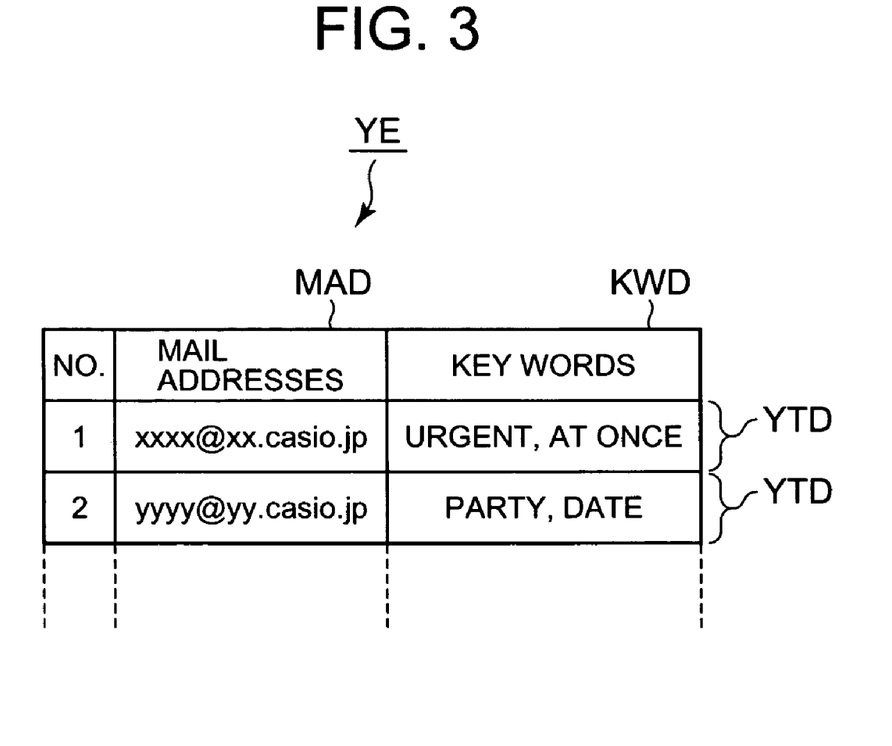
FIG. 3 is view showing contents of reading-out registration data YTD to be registered in a reading-out data registering area YE.

In the mail area of the memory 16, there are provided an address-book area AE, an area YE for registering a reading-out registration data, a mail writing area for storing a written mail, an IN-BOX for storing received mails, and an OUT-BOX for storing mails which have been sent out. In the address-book area AE is registered address-book data AD each including a name D1, a stationary phone number D2, a cellular phone number D3, and a mail address D4, as shown in FIG. 2. In the area YE for registering reading-out data is stored reading-out registration data YTD each piece including a mail address MAD and a key word KWD, as shown in FIG. 3. The reading-out registration data YTD is used to judge whether an incoming-call alert is made or not to notify incoming of a mail as if notifying an incoming telephone call. An operation of making the incoming-call alert to notify incoming of a mail will hereafter be described in detail with reference to a mail receiving operation.

A voice signal processing section 17 digital-analog converts voice data which is to be exchanged with a calling party into an analog signal to output the same signal through the speaker 3, and also analog-digital converts a voice signal from the microphone 6 into voice data to supply the same data to the control section 13. Upon receipt of an instruction from the control section 13, the voice signal processing section 17 synthesizes voice data using human voice data stored in the system ROM 15 to read out contents of a mail, and digital-analog converts the voice data to output voice through the speaker 3. A driver 18 drives LED provided in the camera 8, the speaker 9 and the vibrator 10 for notifying an incoming call. A driver 19 drives the display unit 4 in accordance with an instruction from the control section 13. A driver 20 reads out and/or writes data from and/or into the memory card 7. The memory card 7 has a photographed data area for storing an image file of image data transferred from the image buffer area (work area of the memory 16) and a data area for storing image data and tune data input from an external device. An input/output interface 21 is provided for exchanging data with an external device connected through a serial interface such as USB cable.

II. Operation

Operation of the cellular phone 1 having the above mentioned configuration, that is, main routine operation and mail-receiving operation executed by the control section 13 will be described with reference to FIGS. 4 and 5.

(1) Main Routine Operation

Figure 4:
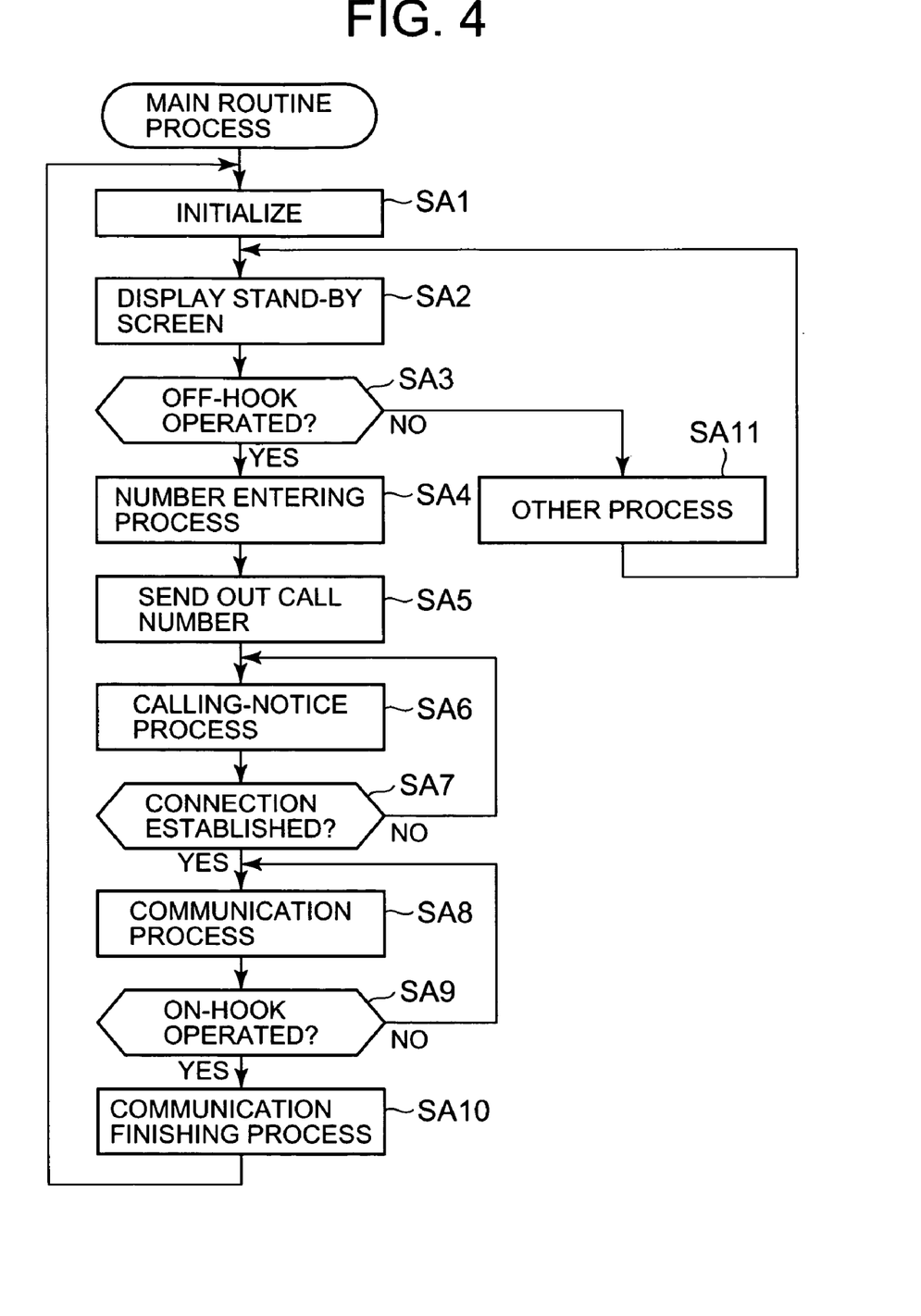
FIG. 4 is a flow chart of a main routine process.
Figure 5:
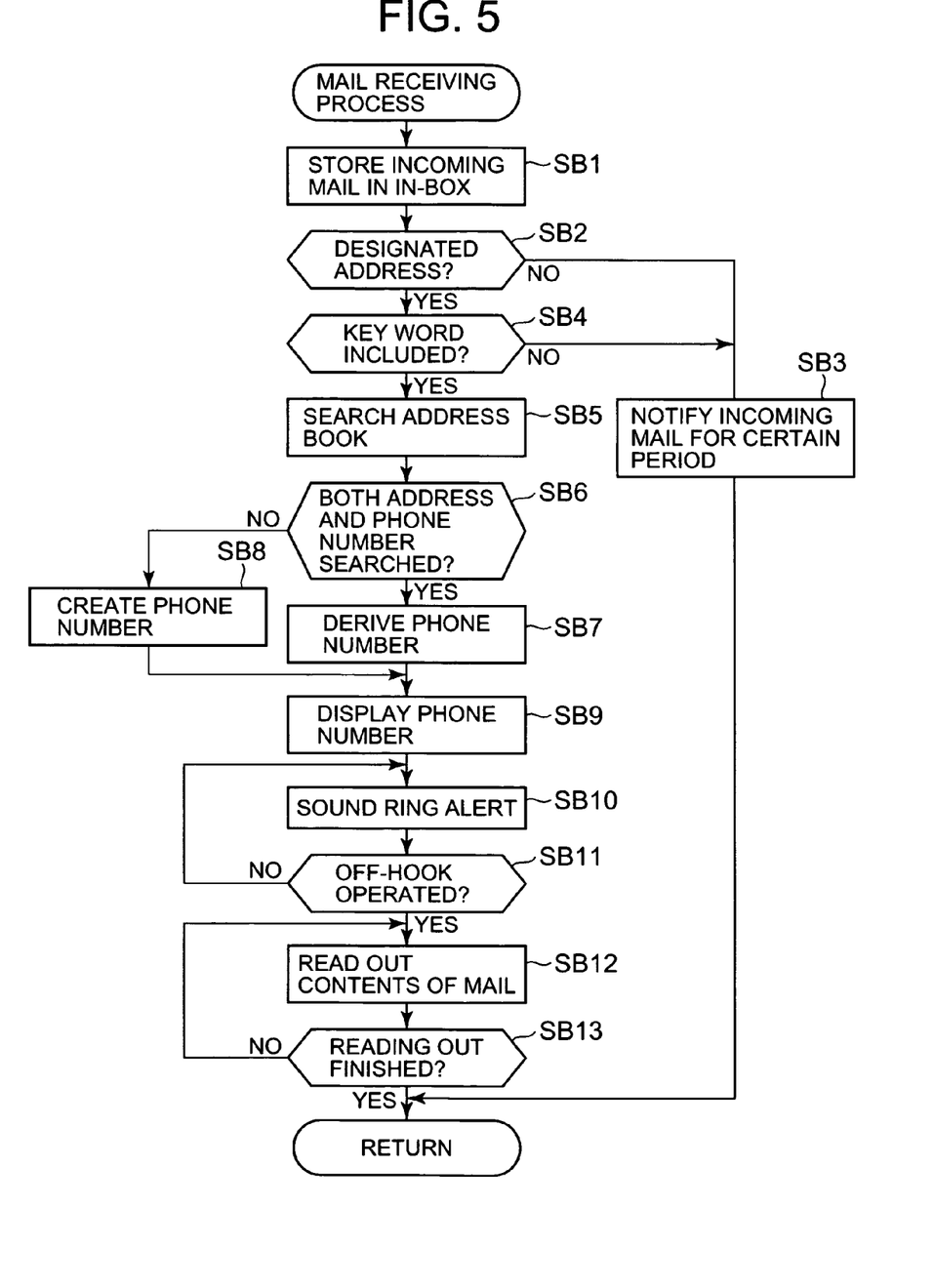
FIG. 5 is a flow chart of a mail receiving process.

When a power switch is turned on and the cellular phone 1 goes on, the control section 13 executes the main routine operation in accordance with the flow chart shown in FIG. 4. Once the main routine has started, the control section 13 initializes entire section in the cellular phone 1 at step SA1 in FIG. 4. Then, the control section 13 advances to step SA2, to form a stand-by screen using stand-by image data which is preset on the system ROM 15 at a factory, and to display the stand-by screen on the display unit 4. At step SA3, it is judged whether an off-hook switch is switched on or not. When a user operates the off-hook switch with the stand-by screen displayed, it is determined "YES" at step SA3, and the operation advances to step SA4.

At step SA4, a number entering screen is displayed on the display unit 4 in place of the stand-by screen, and a number entering process is executed to register in a register a call number entered by manipulating number keys, displaying the same number on the number entering screen. Then, the call number registered in the register during the number entering process is transmitted at step SA5 and a calling-notice process is executed at steps SA6. When a receiving party operates the off-hook switch in response to the calling notice and a line connection has been established between the calling party and the receiving party (YES at step SA7), the operation advances to step SA8, where a communication process is executed. Thereafter, the communication process continues at step SA8, until the on-hook switch is operated. When the user ceases talking and operates on-hook switch (YES at step SA9), the operation advances to step SA10, where a communication finishing process is executed to break the communication line, and the operation returns to step SA2, where the stand-by screen is displayed again.

When a function selecting switch is switched on with the stand-by screen displayed (NO at step SA3), the operation advances to step SA11, where other process (for example, a mail function) selected in response to operation of the function selecting switch is executed. When the other process has been executed, the operation returns to step SA2 again, where the stand-by screen is displayed.

(2) Operation of Mail Receiving Process

A mail receiving process will be described with reference to a flow chart shown in FIG. 5. Upon receipt of a mail during the course of the main routine operation, the control section 13 executes an interruption process to advance to step SB 1 shown in FIG. 5, where the received mail is stored in IN-BOX provided in the mail area of the memory 16. At step SB2, it is judged whether or not a mail address MAD (designated address) that coincides with an address of a sender of the received mail has been registered in the reading-out data registering area YE of the memory 16 (Refer to FIG. 3). That is, it is judged whether the received mail has been sent from the designated address or not. When it is determined at step SB 2 that the received mail has not been sent from the designated address (NO at step SB2), the operation advances to step SB3, where the present mail receiving process is ceased after notifying an incoming mail for a certain period of time, and the present process is finished and then the operation returns to a normal mail receiving operation.

Meanwhile, when it is determined at step SB 2 that the received mail has been transferred from the designated address (YES at step SB2), the operation advances to step SB4, whether it is judged whether or not a key word (designated key word: special word) is included in a title and/or contents of the received mail stored in IN-BOX. When it is determined at step SB4 that the designated key word is not included in the mail (NO at step SB4), the operation advances to step SB3, where the present mail receiving process is ceased after notifying incoming of the mail for a certain period of time, and the operation returns to the normal mail receiving operation. When it is determined at step SB4 that the designated key word is included in a title and/or contents of the incoming mail (YES at step SB4), the operation advances to step SB5.

At step SB5, the control section 13 searches the address-book area RE of the memory 16 for address-book data AD having a mail address D4 that coincides with the mail address of the sender of the received mail. It is judged based on a domain name of the mail address D4 of the searched address-book data AD at step SB6 whether the received mail is a "cellular phone mail" (mail sent from a cellular phone) or an "internet mail". In case the received mail is a "cellular phone mail", it is judged whether or not a cellular phone number D3 corresponding to the cellular phone mail has been registered.

In case the received mail is the "internet mail", it is judged whether or not a phone number (stationary telephone number) D2 has been registered.

When a phone number D2 or cellular phone number D3 corresponding to the mail address D4 has been registered (YES at step SB6), the operation advances to step SB7, where the corresponding phone number is extracted from the address-book area AE. Meanwhile, in case a phone number corresponding to the mail address D4 has not been registered, that is, in case a cellular phone number D3 has not been registered even through a "cellular phone mail" is received, or a phone number D2 has not been registered even through an "internet mail" is received (NO at step SB7), then the operation advances to step SB8, where a phone number corresponding to mail sort ("cellular phone mail" or "internet mail") is created. For example, in the case of "cellular phone mail", a certain phone number beginning with a telecommunications carrier code representing a cellular-phone carrier discriminated from the domain name is created. In the case of "internet mail", a special phone number representing "internet mail" is created.

The phone number extracted at step SB7 or the phone number created at step SB8 is displayed on the display unit 4 at step SB9. At the following step SB10, a ring alert keeps sounding or an incoming-call alert is made until the off-hook switch is operated. When the off-hook switch is operated (YES at step SB11), the operation advances to step SB12, where an instruction is given to a voice-signal processing section 17 to synthesize and reproduce voices of contents of the incoming mail stored in IN-BOX, whereby the contents of the incoming mail are read out with the synthesized voice through the speaker 3. When all the contents of the incoming mail have been read out (YES at step SB13), the present mail receiving process ceases, and the operation returns to the main routine process.

In the present embodiment as has been described above, the reading-out registration data YTD consisting of a mail address MAD and a key word KWD is previously stored in the reading-out data registering area YE of the memory 16. When an address of a sender of the incoming mail coincides with the mail address MAD included in the reading-out registration data YTD and a key word KWD corresponding to the mail address MAD is included in the incoming mail, a phone number corresponding the address of the sender is searched through data recorded in the address book, and the searched phone number is displayed on the display unit 4 while the ring alert is sounding or the incoming-call alert is made, and in the meantime, the contents of the incoming mail are read out with synthesized voice in response to operation of the off-hook switch, whereby when an incoming mail which includes a preset attribute is received, the contents of the incoming mail are read out with synthesized voice, allowing the user to aurally check the contents of the incoming mail in the same manner as in a conventional telephone call. With the present arrangement, not only users (old people, children) who are weak in performing complex manipulation but visually-impaired users can check or understand contents of an incoming mail in a simple manner as described above. Further, the communication terminal apparatus of the invention has advantage that, even if the user should check any incoming mail using the present apparatus during a conference or a meeting, the user can make an appeal of urgency of the mail to those around by pretending as if he or she is answering a conventional telephone call, whereby the user can avoid a fear of being frowned on his or her behavior of checking a mail at such an occasion by using the present arrangement.

In the arrangement of the communication terminal apparatus of the invention, contents of the incoming mail are read out, but the arrangement may be changed such that if a name D1 of a sender has been registered as address-book data AD recorded in the address book, the name D1 and a title of the mail may be read out in addition to the contents of the mail.

Further, in the arrangement of the communication terminal apparatus, the reading-out registration data YTD consisting of mail addresses MAD and key words KWD is used to determine whether or not the incoming-call alert is made to notify receipt of an incoming mail. But it may be possible to determine based on conditions including a date and time of receipt of an incoming mail whether the incoming-call alert is made to notify an incoming mail or not. Further, the arrangement may be changed such that the sender is allowed to include an attribute in his or her mail to be sent, based on which attribute it is determined whether the incoming-call alert is made to notify an incoming mail or not.

In addition, in the arrangement of the communication terminal apparatus, the reading-out registration data YTD consisting of mail addresses MAD and key words KWD is used but registration data which consists only of mail addresses may be used in place of the reading-out registration data YTD including both mail addresses and keywords. In this case, when an address of a mail sender coincides with the mail address included in the reading-out registration data YTD, a phone number corresponding to the address of the mail sender is searched through the data recorded in the address book and the searched phone number is displayed on the display unit 4 while the incoming-call alert is made, and in the meantime the contents of the incoming mail are read out with synthesized voice in response to operation of the off-hook switch.

Furthermore, the arrangement of the communication terminal apparatus may be changed such that, when a key word KWD is not registered but only a mail address MAD is registered in the reading-out registration data YTD consisting of mail addresses MAD and key words KWD, only the registered mail address may be used to determine whether or not the incoming-call alert is made to notify receipt of an incoming mail.

What is claimed is:

1. A communication terminal apparatus comprising:
    attribute storing means for storing a specific attribute;
    mail receiving means for receiving a mail;
    judging means for judging whether or not the mail received by the mail receiving means includes the specific attribute stored in the attribute storing means;
    notifying means for notifying incoming of the mail with an incoming-call alert when it is determined that the received mail includes the specific attribute, and for notifying incoming of the mail with a mail alert when it is determined that the received mail does not include the specific attribute; and
    reading out means for reading out contents of the mail which is determined to include the specific attribute by the judging means with a synthesized voice in response to a user operation which is executed while the notifying means is notifying the incoming of the mail with the incoming-call alert.

2. The communication terminal apparatus according to claim 1, wherein the communication terminal apparatus comprises a voice communication function, and wherein the incoming-call alert which is used to notify the incoming of the mail when it is determined that the received mail includes the specific attribute is also used to notify incoming of a voice call.

3. The communication terminal apparatus according to claim 2, wherein the user operation which is executed while the notifying means is notifying the incoming of the mail with the incoming-call alert is an off-hook operation which is also used to answer the incoming of the voice call.

4. The communication terminal apparatus according to claim 1, wherein the specific attribute is a specific mail address, and wherein the communication terminal apparatus further comprises:
   personal-data storing means for storing personal data including at least a mail address and a phone number;
   searching means for searching the personal data stored in the personal data storing means for a phone number corresponding to the specific mail address; and
   displaying means for displaying the searched phone number when it is determined that the received mail includes the specific attribute.

5. The communication terminal apparatus according to claim 1, wherein the specific attribute is a specific mail address and a keyword, and wherein the communication terminal apparatus further comprises:
   personal-data storing means for storing personal data including at least a mail address and a phone number;
   searching means for searching the personal data stored in the personal data storing means for a phone number corresponding to the specific mail address; and
   displaying means for displaying the searched phone number when it is determined that the received mail includes the specific attribute.

6. The communication terminal apparatus according to claim 1, wherein the specific attribute is a specific mail address, and wherein the communication terminal apparatus further comprises:
   personal-data storing means for storing personal data including at least a mail address and a phone number;
   searching means for searching the personal data stored in the personal data storing means for a phone number corresponding to the specific mail address; and
   displaying means for displaying a corresponding cellular phone number when the specific mail address is a mail address of a cellular phone, and for displaying a corresponding stationary phone number when the specific mail address is a mail address other than a cellular phone.

7. A method of controlling a communication terminal apparatus, comprising:
   storing a specific attribute;
   receiving a mail;
   judging whether or not the received mail includes the stored specific attribute;
   notifying incoming of the mail with an incoming-call alert when it is determined that the received mail includes the specific attribute, and for notifying incoming of the mail with a mail alert when it is determined that the received mail does not include the specific attribute; and
   reading out contents of the mail which is determined to include the specific attribute with a synthesized voice in response to a user operation which is executed while the incoming of the mail is notified by the incoming-call alert.

8. The method according to claim 7, wherein the communication terminal apparatus comprises a voice communication function, and wherein the incoming-call alert which is used to notify the incoming of the mail when it is determined that the received mail includes the specific attribute is also used to notify incoming of a voice call.

9. The method according to claim 8, wherein the user operation which is executed while the incoming of the mail is notified by the incoming-call alert is an off-hook operation which is also used to answer the incoming of the voice call.

10. The method according to claim 7, wherein the specific attribute is a specific mail address, and wherein the method further comprises:
    storing personal data including at least a mail address and a phone number;
    searching the stored personal data for a phone number corresponding to the specific mail address; and
    displaying the searched phone number when it is determined that the received mail includes the specific attribute.

11. The method according to claim 7, wherein the specific attribute is a specific mail address and a keyword, and wherein the method further comprises:
    storing personal data including at least a mail address and a phone number;
    searching the stored personal data for a phone number corresponding to the specific mail address; and
    displaying the searched phone number when it is determined that the received mail includes the specific attribute.

12. The method according to claim 7, wherein the specific attribute is a specific mail address, and wherein the method further comprises:
    storing personal data including at least a mail address and a phone number;
    searching the stored personal data for a phone number corresponding to the specific mail address; and
    displaying a corresponding cellular phone number when the specific mail address is a mail address of a cellular phone, and for displaying a corresponding stationary phone number when the specific mail address is a mail address other than a cellular phone.

13. A computer readable medium having stored therein a program for controlling a communication terminal apparatus to perform functions of:
    storing a specific attribute;
    receiving a mail;
    judging whether or not the received mail includes the stored specific attribute;
    notifying incoming of the mail with an incoming-call alert when it is determined that the received mail includes the specific attribute, and for notifying incoming of the mail with a mail alert when it is determined that the received mail does not include the specific attribute; and
    reading out contents of the mail which is determined to include the specific attribute with a synthesized voice in response to a user operation which is executed while the incoming of the mail is notified by the incoming-call alert.

14. The computer readable medium of claim 13, wherein the communication terminal apparatus comprises a voice communication function, and wherein the incoming-call alert which is used to notify the incoming of the mail when it is determined that the received mail includes the specific attribute is also used to notify incoming of a voice call.

15. The computer readable medium of claim 14, wherein the user operation which is executed while the incoming of the mail is notified by the incoming-call alert is an off-hook operation which is also used to answer the incoming of the voice call.

16. The computer readable medium of claim 13, wherein the specific attribute is a specific mail address, and wherein program controls the communication terminal apparatus to perform further functions of:

storing personal data including at least a mail address and a phone number;

searching the stored personal data for a phone number corresponding to the specific mail address; and     displaying the searched phone number when it is determined that the received mail includes the specific attribute.

17. The computer readable medium of claim 13, wherein the specific attribute is a specific mail address and a keyword, and wherein program controls the communication terminal apparatus to perform further functions of:

storing personal data including at least a mail address and a phone number;

searching the stored personal data for a phone number corresponding to the specific mail address; and     displaying the searched phone number when it is determined that the received mail includes the specific attribute.

18. The computer readable medium of claim 13, wherein the specific attribute is a specific mail address, and wherein program controls the communication terminal apparatus to perform further functions of:

storing personal data including at least a mail address and a phone number;

searching the stored personal data for a phone number corresponding to the specific mail address; and     displaying a corresponding cellular phone number when the specific mail address is a mail address of a cellular phone, and for displaying a corresponding stationary phone number when the specific mail address is a mail address other than a cellular phone.

* * * * *